US012391848B2

(12) United States Patent
Ishiguro et al.

(10) Patent No.: US 12,391,848 B2
(45) Date of Patent: Aug. 19, 2025

(54) POLISHING COMPOSITION, METHOD FOR PRODUCING POLISHING COMPOSITION, POLISHING METHOD, AND METHOD FOR PRODUCING SEMICONDUCTOR SUBSTRATE

(71) Applicant: FUJIMI INCORPORATED, Kiyosu (JP)

(72) Inventors: Sonosuke Ishiguro, Kiyosu (JP); Shogo Onishi, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 901 days.

(21) Appl. No.: 17/196,487

(22) Filed: Mar. 9, 2021

(65) Prior Publication Data

US 2021/0292600 A1     Sep. 23, 2021

(30) Foreign Application Priority Data

Mar. 13, 2020  (JP) ................................. 2020-044292

(51) Int. Cl.
*C09G 1/02*         (2006.01)
(52) U.S. Cl.
CPC ..................................... *C09G 1/02* (2013.01)
(58) Field of Classification Search
CPC ....................................................... C09G 1/02
See application file for complete search history.

(56) References Cited

U.S. PATENT DOCUMENTS

| | | | | |
|---|---|---|---|---|
| 3,888,053 A | * | 6/1975 | White | B24B 37/107 |
| | | | | 451/28 |
| 2006/0046370 A1 | * | 3/2006 | Oh | H01L 21/28035 |
| | | | | 438/585 |
| 2007/0077764 A1 | | 4/2007 | Shimizu | |
| 2015/0284593 A1 | * | 10/2015 | Wang | C09G 1/02 |
| | | | | 438/693 |
| 2017/0175053 A1 | * | 6/2017 | Yokota | C23G 5/028 |
| 2019/0071588 A1 | * | 3/2019 | Tada | H01L 21/30625 |
| 2019/0085208 A1 | * | 3/2019 | Shinoda | C09G 1/02 |
| 2019/0211227 A1 | * | 7/2019 | Dockery | B24B 37/044 |

FOREIGN PATENT DOCUMENTS

| | | | | |
|---|---|---|---|---|
| EP | 2 251 304 A1 | * | 11/2010 | ............ C01B 33/12 |
| JP | 2007-103515 A | | 4/2007 | |
| WO | WO-2016/143323 A1 | | 9/2016 | |

OTHER PUBLICATIONS

Office Action issued in corresponding Chinese Patent Application No. 202110265786.X dated Sep. 26, 2023 (14 pages).
Office Action issued in corresponding Chinese Patent Application No. 202110265786 dated Apr. 24, 2024 (12 pages).

* cited by examiner

*Primary Examiner* — Pegah Parvini
(74) *Attorney, Agent, or Firm* — Foley & Lardner LLP

(57) ABSTRACT

The polishing composition according to the present invention is a polishing composition which contains abrasive grains, an additive, a pH adjusting agent, and a dispersing medium and in which a zeta potential of the abrasive grains is negative, the additive is a crosslinked bicyclic compound having a tertiary nitrogen atom, a content of the additive is more than 0% by mass and less than 0.5% by mass with respect to the entire polishing composition mass, and a pH of the polishing composition is less than 5.

8 Claims, No Drawings

POLISHING COMPOSITION, METHOD FOR PRODUCING POLISHING COMPOSITION, POLISHING METHOD, AND METHOD FOR PRODUCING SEMICONDUCTOR SUBSTRATE

CROSS-REFERENCE TO RELATED APPLICATION

The present application is based on Japanese Patent Application No. 2020-044292 filed on Mar. 13, 2020, and a disclosed content thereof is incorporated herein as a whole by reference.

BACKGROUND

1. Technical Field

The present invention relates to a polishing composition, a method for producing a polishing composition, a polishing method, and a method for producing a semiconductor substrate.

2. Description of Related Arts

In recent years, along with the trend for forming multilayer wiring on the surface of semiconductor substrates, a so-called chemical mechanical polishing (CMP) technology for physically polishing and flattening a semiconductor substrate has been utilized at the time of device production. CMP is a method in which the surface of an object to be polished (object being polished) such as a semiconductor substrate is flattened using a polishing composition (slurry) containing abrasive grains such as silica, alumina, or ceria, an anticorrosive, a surfactant, and the like. The object to be polished (object being polished) is wiring, plug and the like formed of silicon, polysilicon, a silicon oxide film (silicon oxide), silicon nitride, a metal, and the like.

For example, as a technique for polishing a polysilicon film provided on a silicon substrate having a separation region, Japanese Patent Application Laid-Open No. 2007-103515 (corresponding to US Patent Application Publication No. 2007/077764, Korean Patent Application Publication No. 2007/0037409, Chinese Patent Application Publication No. 1939663, and Taiwan Patent Application Publication No. 200725721) discloses a polishing method including a step of performing preliminary polishing using a preliminary polishing composition containing abrasive grains, an alkali, a water-soluble polymer, and water and a step of performing finish polishing using a finish polishing composition containing abrasive grains, an alkali, a water-soluble polymer, and water.

Recently, substrates containing polycrystalline silicon (polysilicon) doped with impurities have been used as a semiconductor substrate, and there is a new demand for polishing of the substrates. Hitherto, investigations into such a demand have not been conducted at all.

Accordingly, an object of the present invention is to provide a means capable of polishing an object to be polished containing polycrystalline silicon doped with p-type impurities at a high polishing speed.

SUMMARY

In order to solve the new problem, the present inventors have intensively conducted studies. As a result, the present inventors have found out that the above-mentioned problem can be solved by a polishing composition which contains abrasive grains, an additive, a pH adjusting agent, and a dispersing medium and in which the zeta potential of the abrasive grains is negative, the additive is a crosslinked bicyclic compound having a tertiary nitrogen atom, the content of the additive is more than 0% by mass and less than 0.5% by mass with respect to the entire polishing composition mass, and the pH of the polishing composition is less than 5, and have thus completed the present invention.

DETAILED DESCRIPTION

Hereinafter, embodiments of the present invention will be described. Incidentally, the present invention is not limited only to the following embodiments.

In the present specification, the operations and the measurements of physical properties and the like are performed under the conditions of room temperature (20° C. or more and 25° C. or less)/relative humidity of 40% RH or more and 50% RH or less unless otherwise stated.

The present invention is a polishing composition which is used for polishing an object to be polished containing polycrystalline silicon doped with p-type impurities and contains abrasive grains, a pH adjusting agent, an additive, and a dispersing medium and in which the zeta potential of the abrasive grains is negative, the additive is a crosslinked bicyclic compound having a tertiary nitrogen atom, the content of the additive is more than 0% by mass and less than 0.5% by mass with respect to the entire polishing composition mass, and the pH of the polishing composition is less than 5. The polishing composition of the present invention having such a configuration can polish an object to be polished containing polycrystalline silicon doped with p-type impurities at a high polishing speed.

The mechanism by which such an effect is attained is considered to be as follows. However, the following mechanism is merely a presumption, and the scope of the present invention is not limited by this. A crosslinked bicyclic compound having a tertiary nitrogen atom is contained in the polishing composition of the present invention as an additive. The unshared electron pair existing on the tertiary nitrogen atom exhibits nucleophilicity. Hence, a compound exhibiting nucleophilicity is used as an additive. In addition, it is considered that the tertiary nitrogen atom contained in the crosslinked bicyclic compound has small steric hindrance near the unshared electron pair and the nucleophilicity is enhanced by this. For example, a B—Si bond is formed on the film surface of polycrystalline silicon doped with boron (B), and polishing of the film surface of the object to be polished is suppressed by this bond. Here, the unshared electron pair of the tertiary nitrogen atom extends the B—Si bond distance formed on the film surface or cleaves the B—Si bond, by donating the unshared electron pair to the B atom on the film surface of the object to be polished. It is considered that the film surface (namely the surface to be polished) of the object to be polished becomes brittle and scraping by abrasive grains becomes easy by this. In other words, the crosslinked bicyclic compound which has a tertiary nitrogen atom and is contained as one component of the polishing composition acts on the chemical bond formed on the film surface of the object to be polished, this makes it easier for the abrasive grains contained in the polishing composition to mechanically scrape the surface to be polished, and efficient polishing can be realized.

[Object to be Polished]

The object to be polished according to the present invention contains polycrystalline silicon (polysilicon) doped with p-type impurities. In other words, the polishing composition according to the present invention is used in an application for polishing the object to be polished containing polycrystalline silicon doped with p-type impurities.

Examples of p-type impurities doped on polycrystalline silicon include group 13 elements such as boron (B), aluminum (Al), gallium (Ga), indium (In) and the like.

The lower limit of the content (doped amount) of p-type impurities doped on polycrystalline silicon is not particularly limited but is preferably 2.5 at % or more, more preferably 5 at % or more with respect to 100 at % of the sum of polycrystalline silicon and impurities. In addition, the upper limit of the content (doped amount) of p-type impurities doped on polycrystalline silicon is not particularly limited but is preferably 20 at % or less, more preferably 15 at % or less with respect to 100 at % of the sum of polycrystalline silicon and impurities. Incidentally, the content of p-type impurities doped on polycrystalline silicon is calculated by the method described in Examples to be described later using a multifunction scanning X-ray photoelectron spectroscopic analysis instrument (XPS).

The object to be polished according to the present invention may contain other materials in addition to polycrystalline silicon (polysilicon) doped with p-type impurities. Examples of other materials include silicon nitride, silicon carbonitride (SiCN), silicon oxide, undoped polycrystalline silicon (undoped polysilicon), undoped amorphous silicon (undoped amorphous silicon), metals, SiGe and the like.

Examples of the object to be polished containing silicon oxide include a TEOS type silicon oxide film (hereinafter, also simply referred to as "TEOS") formed using tetraethyl ortho-silicate as a precursor, an HDP film, a USG film, a PSG film, a BPSG film, an RTO film and the like.

Examples of the metals include tungsten, copper, aluminum, cobalt, hafnium, nickel, gold, silver, platinum, palladium, rhodium, ruthenium, iridium, osmium and the like.

[Polishing Composition]
[Abrasive Grain]

The polishing composition of the present invention contains abrasive grains. In the polishing composition of the present invention, the abrasive grains have a negative (minus) zeta potential. Here, the "zeta (ζ) potential" is the potential difference that occurs at the interface between a solid and a liquid which are in contact with each other when the solid and the liquid perform relative motion.

In the polishing composition of the present invention, the zeta potential of the abrasive grains is preferably −60 mV or more and −5 mV or less, more preferably −50 mV or more and −10 mV or less, still more preferably −45 mV or more and −15 mV or less, particularly preferably −40 mV or more and −15 mV or less. As the abrasive grains have a zeta potential in such a range, the polishing speed can be further improved.

Here, the zeta potential of the abrasive grains in the polishing composition is calculated by setting a diluted solution of the polishing composition in Zetasizer Nano manufactured by Malvern Panalytical of Spectris, subjecting the diluted solution to the measurement by a laser Doppler method (electrophoretic light scattering measurement method) using a capillary cell at a measurement temperature of 25° C., and analyzing the acquired data by the Smoluchowski equation.

Examples of the kind of the abrasive grains in the polishing composition of the present invention include metal oxides such as silica, alumina, zirconia, and titania. The abrasive grains can be used singly or in combination of two or more kinds thereof. As the abrasive grains, commercially available products may be used or synthetic products may be used.

The kind of the abrasive grains is preferably silica and more preferably colloidal silica. Examples of the method for producing colloidal silica include a sodium silicate method and a sol-gel method. Colloidal silica produced by either production method is suitably used as the abrasive grains of the present invention. However, colloidal silica that can be produced with a high purity by a sol-gel method is preferable from the viewpoint of decreasing metal impurities.

The production of colloidal silica by a sol-gel method can be performed by a conventionally known method. Specifically, colloidal silica can be obtained by performing a hydrolysis and condensation reaction using a hydrolyzable silicon compound (for example, an alkoxysilane or a derivative thereof) as a raw material.

The kind of colloidal silica used is not particularly limited, but surface-modified colloidal silica can be used, for example. The surface modification of colloidal silica can be performed, for example, by chemically bonding a functional group of an organic acid to the surface of colloidal silica, that is, by immobilization of an organic acid. Alternatively, the surface modification of colloidal silica can be performed by mixing a metal such as aluminum, titanium, zirconium or the like or an oxide thereof with colloidal silica and doping the surface of the silica particles with the metal or the oxide thereof.

In a preferred embodiment of the present invention, the colloidal silica contained in the polishing composition is colloidal silica in which an organic acid is immobilized on the surface. Colloidal silica in which an organic acid is immobilized on the surface tends to have a greater absolute value of the zeta potential in the polishing composition as compared to ordinary colloidal silica on which an organic acid is not immobilized. For this reason, it is easy to adjust the zeta potential of colloidal silica in the polishing composition to be negative (for example, in a range of −45 mV or more and −15 mV or less).

Examples of colloidal silica in which an organic acid is immobilized on the surface preferably include colloidal silica in which an organic acid such as a carboxylic acid group, a sulfonic acid group, a phosphonic acid group, or an aluminic acid group is immobilized on the surface. Among these, colloidal silica in which a sulfonic acid or a carboxylic acid is immobilized on the surface is preferable and colloidal silica in which sulfonic acid is immobilized on the surface is more preferable from the viewpoint of easy production.

Immobilization of an organic acid on the surface of colloidal silica cannot be achieved by simply allowing the colloidal silica and the organic acid to coexist. For example, if sulfonic acid that is a kind of organic acid is immobilized on colloidal silica, the immobilization can be performed by the method described in, for example, "Sulfonic acid-functionalized silica through of thiol groups", Chem. Commun. 246-247 (2003). Specifically, it is possible to obtain colloidal silica (sulfonic acid-modified colloidal silica) in which sulfonic acid is immobilized on the surface by coupling a silane coupling agent having a thiol group such as 3-mercaptopropyltrimethoxysilane or the like with colloidal silica and then oxidizing the thiol group with hydrogen peroxide.

Alternatively, the immobilization can be performed by the method described in, for example, "Novel Silane Coupling Agents Containing a Photolabile 2-Nitrobenzyl Ester for Introduction of a Carboxy Group on the Surface of Silica Gel", Chemistry Letters, 3, 228-229 (2000) if a carboxylic acid that is a kind of organic acid is immobilized on colloidal silica. Specifically, it is possible to obtain colloidal silica (carboxylic acid-modified colloidal silica) in which a carboxylic acid is immobilized on the surface by coupling a silane coupling agent containing a photoreactive 2-nitrobenzyl ester with colloidal silica and then performing photoirradiation.

Here, the shape of the abrasive grains is not particularly limited and may be a spherical shape or a non-spherical shape. Specific examples of non-spherical shapes include various shapes such as polygonal columns such as a triangular column and a quadrangular column, a cylindrical shape, a bale shape in which the central portion of a cylinder is bulged more than the end portion, a donut shape in which the central portion of a disc penetrates, a tabular shape, a so-called cocoon shape having a constriction at the central portion, a so-called associated spherical shape in which a plurality of particles are integrated, a so-called kompeito shape having a plurality of bulges on the surface, and a rugby ball shape, and the shape is not particularly limited.

The size of the abrasive grains is not particularly limited. For example, the average primary particle size of the abrasive grains is preferably 5 nm or more, more preferably 8 nm or more, still more preferably 10 nm or more, particularly preferably 12 nm or more. As the average primary particle size of the abrasive grains increases, the polishing speed of the object to be polished by the polishing composition is further improved. In addition, the average primary particle size of the abrasive grains is preferably 100 nm or less, more preferably 50 nm or less, still more preferably 30 nm or less, particularly preferably 20 nm or less, most preferably 15 nm or less. As the average primary particle size of the abrasive grains decreases, it is easier to obtain a surface with few defects by polishing using the polishing composition. In other words, the average primary particle size of the abrasive grains is preferably 5 nm or more and 100 nm or less, more preferably 8 nm or more and 50 nm or less, still more preferably 10 nm or more and 30 nm or less, particularly preferably 12 nm or more and 20 nm or less, most preferably 12 nm or more and 15 nm or less. Incidentally, the average primary particle size of the abrasive grains can be calculated, for example, based on the specific surface area (SA) of the abrasive grains calculated by a BET method, assuming that the shape of the abrasive grains is a true sphere. In the present specification, the average primary particle size of the abrasive grains adopts the value measured by the method described in Examples.

In addition, the average secondary particle size of the abrasive grains is preferably 10 nm or more, more preferably 15 nm or more, still more preferably 20 nm or more, particularly preferably 25 nm or more. As the average secondary particle size of the abrasive grains increases, the resistance during polishing decreases and stable polishing is possible. In addition, the average secondary particle size of the abrasive grains is preferably 400 nm or less, more preferably 300 nm or less, still more preferably 200 nm or less, particularly preferably 100 nm or less, most preferably 50 nm or less. As the average secondary particle size of the abrasive grains decreases, the surface area of the abrasive grains per unit mass increases, the frequency of contact with the object to be polished is improved, and the polishing speed is further improved. In other words, the average secondary particle size of the abrasive grains is preferably 10 nm or more and 400 nm or less, more preferably 15 nm or more and 300 nm or less, still more preferably 20 nm or more and 200 nm or less, particularly preferably 25 nm or more and 100 nm or less, particularly preferably 25 nm or more and 50 nm or less. Incidentally, the average secondary particle size of the abrasive grains can be measured, for example, by a dynamic light scattering method typified by a laser diffraction scattering method.

The average degree of association of the abrasive grains is preferably 5.0 or less, more preferably 4.0 or less, still more preferably 3.0 or less, particularly preferably 2.5 or less. As the average degree of association of the abrasive grains decreases, defects can be further decreased. The average degree of association of the abrasive grains is also preferably 1.0 or more, more preferably 1.5 or more, still more preferably 2.0 or more. This average degree of association is attained by dividing the value of the average secondary particle size of the abrasive grains by the value of the average primary particle size thereof. As the average degree of association of the abrasive grains increases, there is an advantageous effect that the polishing speed of the object to be polished by the polishing composition is further improved.

The upper limit of the aspect ratio of the abrasive grains in the polishing composition is not particularly limited but is preferably less than 2.0, more preferably 1.8 or less, still more preferably 1.5 or less. With such a range, defects on the surface of the object to be polished can be further decreased. Incidentally, the aspect ratio is an average of the values attained by taking the smallest rectangle circumscribing the image of the abrasive grains taken using a scanning electron microscope and dividing the length of the long side of the rectangle by the length of the short side of the same rectangle and can be determined using general image analysis software. The lower limit of the aspect ratio of the abrasive grains in the polishing composition is not particularly limited but is preferably 1.0 or more, more preferably 1.2 or more.

In the particle size distribution of the abrasive grains determined by a laser diffraction scattering method, the lower limit of the ratio D90/D10 of the particle diameter (D90) when the particle mass integrated from the fine particle side reaches 90% of the entire particle mass to the particle diameter (D10) when the particle mass integrated from the fine particle side reaches 10% of the entire particle mass of all particles is not particularly limited but is preferably 1.1 or more, more preferably 1.4 or more, still more preferably 1.7 or more, most preferably 2.0 or more. In addition, in the particle size distribution of the abrasive grains in the polishing composition determined by a laser diffraction scattering method, the upper limit of the ratio D90/D10 of the particle diameter (D90) when the particle mass integrated from the fine particle side reaches 90% of the entire particle mass to the particle diameter (D10) when the particle mass integrated from the fine particle side reaches 10% of the entire particle mass of all particles is not particularly limited but is preferably 3.0 or less, more preferably 2.5 or less. With such a range, defects on the surface of the object to be polished can be further decreased.

The size (average primary particle size, average secondary particle size, aspect ratio, D90/D10 and the like) of the abrasive grains can be appropriately controlled by the selection of the method for producing the abrasive grains and the like.

The content (concentration) of the abrasive grains is not particularly limited but is preferably 0.5% by mass or more, more preferably 0.8% by mass or more, still more preferably 1% by mass or more, yet still more preferably more than 1% by mass, particularly preferably 1.5% by mass or more with respect to the total mass of the polishing composition. In addition, the upper limit of the content of the abrasive grains is preferably 20% by mass or less, more preferably 15% by mass or less, still more preferably 10% by mass or less, particularly preferably 5% by mass or less with respect to the total mass of the polishing composition. In other words, the content of the abrasive grains is preferably 0.5% by mass or more and 20% by mass or less, more preferably 0.8% by mass or more and 20% by mass or less, still more preferably 1% by mass or more and 15% by mass or less, yet still more preferably more than 1% by mass and 10% by mass or less, particularly preferably 1.5% by mass or more and 5% by mass or less with respect to the total mass of the polishing composition. With such a range, the polishing speed can be improved while suppressing the cost. Incidentally, in a case in which the polishing composition contains two or more kinds of abrasive grains, the content of the abrasive grains means the total amount of these.

[Additive]

The polishing composition of the present invention contains a crosslinked bicyclic compound having a tertiary nitrogen atom as an additive. The tertiary nitrogen atom means a nitrogen atom (N atom) to which three carbon atoms are bonded. Hence, the nitrogen atom existing in the crosslinked bicyclic compound is preferably bonded to an aliphatic hydrocarbon group or an aromatic hydrocarbon group. In the crosslinked bicyclic compound, the group bonded to the tertiary nitrogen atom is more preferably an aliphatic hydrocarbon group, still more preferably an alkyl group (alkylene group). As the nitrogen atom existing in the crosslinked bicyclic compound is a tertiary nitrogen atom, the nucleophilicity of the nitrogen atom is higher. By this, the additive can effectively act on the film surface (specifically, the chemical bond formed on the film surface) of the object to be polished when polishing is performed using the polishing composition.

Here, the nitrogen atom existing in the crosslinked bicyclic compound may be one of the atoms forming the crosslinked ring or may be contained in the substituent of the crosslinked ring as long as it is a tertiary nitrogen atom. The nitrogen atom existing in the crosslinked bicyclic compound is preferably one of the atoms forming the crosslinked ring. Hence, the crosslinked bicyclic compound having a tertiary nitrogen atom is preferably an azabicyclo compound in which the nitrogen atom existing in the ring is a tertiary nitrogen atom, namely, an azabicyclo compound having a tertiary nitrogen atom as a ring-forming atom.

The tertiary nitrogen atom of the crosslinked bicyclic compound is only required to be at least one and may be two or more. For example, it is preferable that the crosslinked bicyclic compound has two tertiary nitrogen atoms since the effect of the present invention is further exerted. In addition, the crosslinked bicyclic compound may further have a nitrogen atom (for example, a secondary nitrogen atom or a primary nitrogen atom) other than the tertiary nitrogen atom.

As the crosslinked bicyclic compound having a tertiary nitrogen atom, those having 5 to 15 carbon atoms are preferable, those having 6 to 12 carbon atoms are more preferable, those having 6 to 10 carbon atoms are still more preferable, and those having 6 to 8 carbon atoms are particularly preferable. In other words, in a more preferred embodiment, the additive used in the present invention is a crosslinked bicyclic compound having a tertiary nitrogen atom and 6 to 12 carbon atoms (still more preferably 6 to 10 carbon atoms, particularly preferably 6 to 8 carbon atoms). In addition, in a still more preferred embodiment, the additive used in the present invention is an azabicyclo compound having a tertiary nitrogen atom as a ring-forming atom and 6 to 12 carbon atoms (still more preferably 6 to 10 carbon atoms, particularly preferably 6 to 8 carbon atoms).

The additive used in the present invention is represented by the following structural formula (1) in a preferred embodiment.

[Chem. 1]

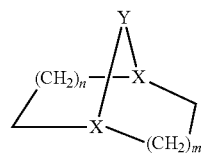

(1)

In the formula (1), each of X is independently a nitrogen atom or CH,

Y is —NH—, —NR$^1$—, or —R$^2$—, wherein R$^1$ is a substituted or unsubstituted alkyl group having 1 to 3 carbon atoms and R$^2$ is a substituted or unsubstituted alkylene group having 1 to 3 carbon atoms, and n and m are each independently an integer 0 to 2, wherein at least one of X is N, or Y is —NR$^1$—.

Here, in a case in which the groups of R$^1$ and R$^2$ have a substituent, the substituent is halogen (fluorine, chlorine, or bromine), —NR$^3$R$^4$ (R$^3$ and R$^4$ are each independently hydrogen or an alkyl group having 1 to 3 carbon atoms), or an alkyl group having 1 to 3 carbon atoms.

In formula (1), the alkyl group having 1 to 3 carbon atoms may be linear or branched and is, for example, a methyl group, an ethyl group, an n-propyl group, or an isopropyl group. R$^1$ is preferably a methyl group. In formula (1), the alkylene group having 1 to 3 carbon atoms may be linear or branched and is, for example, a methylene group, an ethylene group, a trimethylene group (—CH$_2$CH$_2$CH$_2$—), or a propylene group (—CH$_2$CH(CH$_3$)—). R$^2$ is preferably a methylene group or an ethylene group. In formula (1), n and m are each independently 0, 1, or 2.

In a preferred embodiment, in formula (1), each X is independently a nitrogen atom or CH, Y is —NH—, —N(CH$_3$)—, —CH$_2$—, or —CH$_2$CH$_2$—, and n and m are each independently an integer 0 to 2, wherein at least one of X is N, or Y is —N(CH$_3$)—.

Examples of the compound represented by formula (1) include the following compounds.

[Chem. 2]

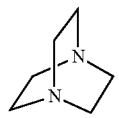

(1-1)

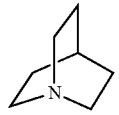

(1-2)

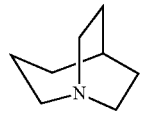

(1-3)

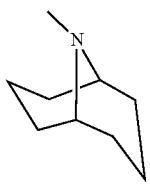
(1-4)

The compound represented by the formula (1-1) is 1,4-diazabicyclo[2.2.2]octane (another name: triethylenediamine), and the compound represented by the formula (1-2) is 1-azabicyclo[2.2.2]octane (another name: quinuclidine). The compound represented by the formula (1-3) is 1-azabicyclo[3.2.2]nonane (another name: homoquinuclidine), and the compound represented by the formula (1-4) is 9-methyl-9-azabicyclo[3.3.1]nonane (another name: granatane). Among these crosslinked bicyclic compounds, at least one kind selected from 1,4-diazabicyclo[2.2.2]octane or 1-azabicyclo[2.2.2]octane is preferable for the purpose of improving the polishing speed.

The content (concentration) of the additive is more than 0% by mass and less than 0.5% by mass with respect to the entire polishing composition mass (total mass of the polishing composition). With such a range, the polishing speed can be improved. In addition, the content of the additive is preferably 0.001% by mass or more, more preferably 0.01% by mass or more, still more preferably 0.03% by mass or more, particularly preferably 0.06% by mass or more with respect to the total mass of the polishing composition. In addition, the upper limit of the content of the additive is preferably 0.45% by mass or less, more preferably 0.3% by mass or less, still more preferably 0.25% by mass or less, particularly preferably 0.2% by mass or less with respect to the total mass of the polishing composition. In other words, the content of the additive is preferably 0.001% by mass or more and 0.45% by mass or less, more preferably 0.01% by mass or more and 0.3% by mass or less, still more preferably 0.03% by mass or more and 0.25% by mass or less, particularly preferably 0.06% by mass or more and 0.2% by mass or less with respect to the total mass of the polishing composition. With such a range, the polishing speed can be improved while suppressing the cost. Incidentally, in a case in which the polishing composition contains two or more kinds of additives, the content of the additive means the total amount of these.

[pH and pH Adjusting Agent]

The pH of the polishing composition of the present invention is less than 5. If the pH is 5 or more, the polishing speed of the object to be polished cannot be improved. The pH of the polishing composition of the present invention is only required to be less than 5 but is preferably pH 4.9 or less, more preferably pH 4.5 or less, still more preferably pH 4 or less, particularly preferably pH 3 or less, most preferably pH 2.5 or less. When the pH is less than 5, there is an advantageous effect of improving the polishing speed of the object to be polished, particularly polycrystalline silicon containing p-type impurities. The lower limit of pH is preferably 1.0 or more, more preferably 1.5 or more.

The polishing composition of the present invention contains a pH adjusting agent. The pH adjusting agent adjusts the pH of the polishing composition to a desired value.

The pH adjusting agent contained in the polishing composition of the present invention includes inorganic acids, organic acids, alkalis and the like. These may be used singly or in combination of two or more kinds thereof.

Specific examples of inorganic acids that can be used as a pH adjusting agent include, for example, hydrochloric acid, sulfuric acid, nitric acid, hydrofluoric acid, boric acid, carbonic acid, hypophosphorous acid, phosphorous acid, and phosphoric acid. Among these, preferred ones are hydrochloric acid, sulfuric acid, nitric acid, or phosphoric acid.

Specific examples of organic acids that can be used as a pH adjusting agent include, for example, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furancarboxylic acid, 3-furancarboxylic acid, 2-tetrahydrofurancarboxylic acid, methoxyacetic acid, methoxyphenylacetic acid, and phenoxyacetic acid. Organic sulfuric acids such as methanesulfonic acid, ethanesulfonic acid, and isethionic acid may be used. Among these, preferred ones are dicarboxylic acids such as malonic acid, succinic acid, glutaric acid, adipic acid, pimelic acid, maleic acid, phthalic acid, malic acid, and tartaric acid and tricarboxylic acids such as citric acid.

Salts such as alkali metal salts of inorganic acids or organic acids may be used as a pH adjusting agent instead of inorganic acids or organic acids or in combination with inorganic acids or organic acids. In the case of a combination of a weak acid with a strong base, a strong acid with a weak base, or a weak acid with a weak base, a pH buffering action can be expected.

Specific examples of the alkali that can be used as a pH adjusting agent include ammonia, sodium hydroxide, potassium hydroxide, tetramethylammonium hydroxide and the like. The content of the pH adjusting agent can be selected by appropriately adjusting the content within the range in which the effect of the present invention is exhibited.

Incidentally, the pH of the polishing composition can be measured using, for example, a pH meter. Specifically, the pH of the polishing composition can be measured by using a pH meter (for example, model: LAQUA manufactured by HORIBA, Ltd.) and the like and calibrating the pH meter at three points using standard buffer (phthalate pH buffer pH: 4.01 (25° C.), neutral phosphate pH buffer pH: 6.86 (25° C.), carbonate pH buffer pH: 10.01 (25° C.)) and then measuring the pH value after the glass electrode has been placed in the polishing composition and the pH value are stabilized after a lapse of two or more minutes.

[Dispersing Medium]

The polishing composition of the present invention contains a dispersing medium for dispersing the respective components. Examples of the dispersing medium include water; alcohols such as methanol, ethanol, and ethylene glycol; ketones such as acetone or the like; mixtures thereof; and the like. Among these, water is preferable as the dispersing medium. In other words, according to a preferred embodiment of the present invention, the dispersing medium contains water. According to a more preferred embodiment of the present invention, the dispersing medium is substantially composed of water. Incidentally, the term "substantially" means that a dispersing medium other than water may be contained as long as the intended effect of the present invention can be achieved, and more specifically, the dispersing medium is composed of preferably 90% by mass or more and 100% by mass or less of water and 0% by mass or more and 10% by mass or less of a dispersing medium other than water, more preferably 99% by mass or more and 100% by mass or less of water and 0% by mass or more and 1% by mass or less of a dispersing medium other than water. Most preferably, the dispersing medium is water.

As the dispersing medium, water containing as little impurities as possible is preferable, and specifically, pure water, ultrapure water, or distilled water from which impurity ions have been removed with an ion exchange resin and then foreign substances have been removed through a filter is more preferable from the viewpoint of not inhibiting the action of the components contained in the polishing composition.

[Other Components]

The polishing composition of the present invention may further contain known additives such as an oxidizing agent, a complexing agent, an antiseptic agent, an antifungal agent and the like that can be used in polishing compositions if necessary as long as the effects of the present invention are not significantly impaired.

[Method for Producing Polishing Composition]

The method for producing the polishing composition of the present invention is not particularly limited, and for example, a polishing composition can be obtained by stirring and mixing abrasive grains, additives, a pH adjusting agent, and, if necessary, other components in a dispersing medium (for example, water). The details of the respective components are as described above. Consequently, the present invention provides a method for producing the polishing composition of the present invention, which includes mixing the abrasive grains, the additive, the pH adjusting agent, and the dispersing medium.

The temperature at which the respective components are mixed is not particularly limited but is preferably 10° C. or more and 40° C. or less, and heating may be performed to increase the rate of dissolution. In addition, the mixing time is also not particularly limited as long as uniform mixing is performed.

[Polishing Method and Method for Producing Semiconductor Substrate]

As described above, the polishing composition of the present invention is suitably used in the polishing of an object to be polished containing polycrystalline silicon doped with p-type impurities. Hence, the present invention provides a polishing method for polishing an object to be polished containing polycrystalline silicon doped with p-type impurities using the polishing composition of the present invention. The present invention also provides a method for producing a semiconductor substrate, which includes polishing a semiconductor substrate containing polycrystalline silicon doped with p-type impurities by the polishing method.

As the polishing apparatus, it is possible to use a general polishing apparatus to which a holder for holding a substrate or the like having an object to be polished, a motor capable of changing the number of revolutions and a polishing table to which a polishing pad (polishing cloth) can be attached, and the like.

As the polishing pad, a general non-woven fabric, polyurethane, a porous fluororesin and the like can be used without particular limitation. The polishing pad is preferably subjected to grooving so that the polishing liquid is accumulated in the groove.

With regard to the polishing conditions, for example, the rotational speed of the polishing table is preferably 10 rpm or more and 500 rpm or less. The pressure (polishing pressure) applied to the substrate having an object to be polished is preferably 0.5 psi or more and 10 psi or less. The method for supplying the polishing composition to the polishing pad is not particularly limited, and, for example, a method in which the polishing composition is continuously supplied to the polishing pad using a pump or the like is employed. There is no limitation on this amount supplied, but it is preferable that the surface of the polishing pad is covered with the polishing composition of the present invention at all times.

After completion of polishing, the substrate is washed in running water, and the water droplets attached to the substrate are shaken off and the substrate is dried using a spin dryer and the like, whereby a substrate containing polycrystalline silicon doped with a p-type impurities is obtained.

The polishing composition of the present invention may be a one-component type or a multi-component type including a two-component type. In addition, the polishing composition of the present invention may be prepared by diluting a stock solution of a polishing composition with a diluent such as water, for example, 10-fold or more.

While embodiments of the present invention have been described in detail, it should be understood that this is illustrative and exemplary, and not limiting, and the scope of the present invention should be interpreted by the appended claims.

The present invention includes the following aspects and embodiments.

1. A polishing composition containing abrasive grains, an additive, a pH adjusting agent, and a dispersing medium, in which
   a zeta potential of the abrasive grains is negative,
   the additive is a crosslinked bicyclic compound having a tertiary nitrogen atom,
   a content of the additive is more than 0% by mass and less than 0.5% by mass with respect to an entire polishing composition mass, and
   a pH of the polishing composition is less than 5.
2. The polishing composition according to 1., in which the additive is an azabicyclo compound having a tertiary nitrogen atom as a ring-forming atom and 6 to 12 carbon atoms.
3. The polishing composition according to 1, or 2., in which the additive is a compound represented by the following structural formula (1):

[Chem. 3]

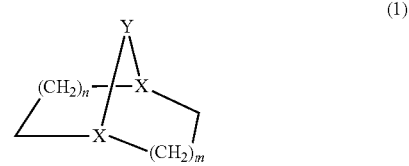

(1)

in formula (1),
each of X is independently a nitrogen atom or CH,
Y is —NH—, —NR$^1$—, or —R$^2$—, wherein R$^1$ is a substituted or unsubstituted alkyl group having 1 to 3 carbon atoms and R$^2$ is a substituted or unsubstituted alkylene group having 1 to 3 carbon atoms, and
n and m are each independently an integer 0 to 2, wherein at least one of X is N, or Y is —NR$^1$—.

4. The polishing composition according to any one of 1. to 3., in which a content of the abrasive grains is more than 1% by mass and 10% by mass or less with respect to an entire polishing composition mass.
5. The polishing composition according to any one of 1. to 4., in which the abrasive grains are colloidal silica in which an organic acid is immobilized on a surface.
6. The polishing composition according to any one of 1. to 5., in which a zeta potential of the abrasive grains is −45 mV or more and −15 mV or less.
7. The polishing composition according to any one of 1. to 6., in which the polishing composition is used in an application for polishing an object to be polished containing polycrystalline silicon doped with a p-type impurity.
8. A polishing method including polishing an object to be polished using the polishing composition according to any one of 1. to 7.
9. A method for producing a semiconductor substrate, the method including polishing a semiconductor substrate containing polycrystalline silicon doped with a p-type impurity by the polishing method according to 8.

EXAMPLES

The present invention will be described in more detail with reference to the following Examples and Comparative Examples. However, the technical scope of the present invention is not limited only to the following Examples. Incidentally, "%" and "parts" respectively mean "% by mass" and "parts by mass" unless otherwise stated.
<Preparation of Polishing Composition>
(Preparation of Surface-Modified Colloidal Silica)

As colloidal silica, sulfonic acid-modified colloidal silica that has an average primary particle size of 13.5 nm, an average secondary particle size of 31.0 nm, an average degree of association of 2.3, and D90/D10 of 2.3 (D90: 44 nm, D10: 19 nm) was prepared by the method described in "Sulfonic acid-functionalized silica through quantitative oxidation of thiol groups", Chem. Commun. 246-247 (2003). Incidentally, the average primary particle size and average secondary particle size of the sulfonic acid-modified colloidal silica were measured according to the following method for measuring the particle size of abrasive grains.

Example 1

The sulfonic acid-modified colloidal silica (colloidal silica; average primary particle size: 13.5 nm, average secondary particle size: 31.0 nm, average degree of association: 2.3, and D90/D10: 2.3) obtained above as abrasive grains and triethylenediamine as an additive were added to pure water as a dispersing medium at room temperature (25° C.) so as to have a final concentration of 4% by mass and 0.1% by mass, respectively, thereby obtaining a mixed solution.

Thereafter, maleic acid as a pH adjusting agent was added to the mixed solution so that the pH was 2.3, and the mixture was stirred and mixed at room temperature (25° C.) for 30 minutes, thereby preparing a polishing composition. The pH of the polishing composition (liquid temperature: 25° C.) was confirmed using a pH meter (model: LAQUA manufactured by HORIBA, Ltd.). In addition, the zeta potential of the sulfonic acid-modified colloidal silica in the obtained polishing composition was measured by the following method for measuring the zeta potential of abrasive grains and found to be −27.8 mV. Triethylenediamine that is an additive used in the polishing composition has a tertiary nitrogen atom. Incidentally, the particle size of the abrasive grains (sulfonic acid-modified colloidal silica) in the polishing composition was the same as the particle size of the abrasive grains used.
Measuring Method
[Zeta Potential of Abrasive Grain]

The obtained polishing composition was diluted so that the abrasive grain concentration was 0.01% by mass, this diluted solution of the polishing composition was set in a zeta potential measurement device (Zetasizer Nano manufactured by Malvern Panalytical of Spectris), and the measurement was performed by a laser Doppler method (electrophoretic light scattering measurement method) using a capillary cell at a measurement temperature of 25° C. The zeta potential of the abrasive grains was calculated by analyzing the acquired data by the Smoluchowski equation.
[Particle Size of Abrasive Grain]

The average primary particle size of the abrasive grains was calculated from the specific surface area of the abrasive grains measured by the BET method using "Flow Sorb II 2300" manufactured by Micromeritics Instrument Corporation, and the density of the abrasive grains. In addition, the average secondary particle size of the abrasive grains was measured using a dynamic light scattering particle diameter and particle size distribution apparatus UPA-UTI151 manufactured by Nikkiso Co., Ltd.

Examples 2 to 11, Comparative Examples 1 to 14

The respective polishing compositions of Examples 2 to 11, Comparative Examples 1 to 16, and Reference Examples 1 and 2 were prepared in the same manner as in Example 1 except that the kind and content of additive, the kind and content of abrasive grains, and the pH (content of pH adjusting agent) were changed as presented in the following Tables 1 and 2. Incidentally, the notation "-" in the following Tables 1 and 2 indicates that the corresponding agent is not contained. The pH of the respective polishing compositions obtained and the average secondary particle size and zeta potential of the sulfonic acid-modified colloidal silica or the unmodified colloidal silica in the respective polishing compositions are presented in the following Tables 1 and 2.
<Evaluation>

The polishing speed was measured when any of the following objects to be polished was polished using the respective polishing compositions obtained above under the following polishing conditions.
(Polishing Apparatus and Polishing Condition)
  Polishing apparatus: Lapping Machine EJ-380IN-CH manufactured by ENGIS JAPAN CORPORATION
  Polishing pad: Hard Polyurethane Pad IC1010 manufactured by NITTA HAAS INCORPORATED
  Polishing pressure: 3.0 psi (1 psi=6894.76 Pa)
  Number of revolutions of polishing table: 60 rpm
  Number of revolutions of head (carrier): 60 rpm
  Supply of polishing composition: free-flowing
  Amount of polishing composition supplied: 100 mL/min
  Polishing time: 60 seconds.
(Object to be Polished)

The following 300 mm blanket wafers were prepared as the object to be polished. A polishing test was performed using a coupon obtained by cutting each wafer into chips of 30 mm×30 mm as a test piece. Details of the object to be polished used in the test are presented below. Incidentally, the content (doped amount) of impurities is the amount with respect to 100 at % of the sum of polysilicon and impurities.

Polysilicon Doped with p-Type Impurities
(1) Boron-doped polysilicon (boron content: 11.5 at %)
(2) Aluminum-doped polysilicon (aluminum content: 10 at %)

Incidentally, the content of p-type impurities doped on polycrystalline silicon is calculated using the following instrument under the following conditions.

Measuring instrument; Multifunction scanning X-ray photoelectron spectroscopic analysis instrument (XPS)
Instrument name and manufacturer: PHI5000 Versa Probe manufactured by ULVAC-PHI, INCORPORATED.
Measurement: In the case of boron-doped polysilicon, there were four measurement elements of boron, silicon, oxygen, and carbon, the number of sweeps of the measuring instrument was set to 10 for each element, and the boron content (B content) (at %) with respect to 100 at % of the sum of polysilicon and boron was calculated by the following equation (i) using the polysilicon output value (Poly-Si output value; namely the total output value of Si, 0, and C) and the boron output value (B output value).

B content (at %)=B output value (%)/(Poly-Si output value (%)+B output value (%)). Equation (i)

Incidentally, in the case of aluminum-doped polysilicon, the aluminum content (Al content) (at %) with respect to 100 at % of the sum of polysilicon and aluminum was calculated under, for example, the same conditions as for boron-doped polysilicon except that the measurement elements were aluminum, silicon, oxygen, and carbon and the B output value (%) in the equation (i) was changed to the aluminum output value (Al output value).

The objects to be polished used in the evaluation of the respective polishing compositions are presented in Tables 1 and 2. Incidentally, in Tables 1 and 2, impurities doped on the objects to be polished are listed in the column of "species doped on polysilicon". It indicates boron-doped polysilicon of (1) above in a case in which the species doped on polysilicon is boron, and it indicates the aluminum-doped polysilicon of (2) above in a case in which the species doped on polysilicon is aluminum.

(Polishing Speed)

The polishing speed (polishing rate) was calculated by the following equation. Incidentally, 1 Å=0.1 nm.

$$\text{Polishing rate [Å/min]} = \frac{\text{(Film thickness before polishing [Å]} - \text{Film thickness after polishing [Å])}}{\text{Polishing time [min]}}$$ [Math. 1]

The film thickness was determined using a light interference type film thickness measurement apparatus Lambda Ace VM-2030 manufactured by SCREEN Semiconductor Solutions Co., Ltd. and evaluated by dividing the difference in film thickness before and after polishing by the polishing time. The results are presented in the following Tables 1 and 2.

TABLE 1

| | Polishing composition | | | | | | | Evaluation | |
|---|---|---|---|---|---|---|---|---|---|
| | | Abrasive grain | | | | Additive | | Object to be polished | |
| | pH | Kind | Average secondary particle size [nm] | Zeta potential [mV] | Content [% by mass] | Kind | Number of carbon atoms bonded to nitrogen atom | Content [% by mass] | Species (impurity) doped on polysilicon | Polishing speed [Å/min] |
| Example 1 | 2.3 | Sulfonic acid-modified silica | 31 | −27.8 | 4 | Triethylenediamine | 3 | 0.1 | Boron | 150 |
| Example 2 | 2.3 | Sulfonic acid-modified silica | 31 | −27.8 | 4 | Quinuclidine | 3 | 0.1 | Boron | 145 |
| Example 3 | 2.3 | Sulfonic acid-modified silica | 31 | −27.8 | 3 | Triethylenediamine | 3 | 0.1 | Boron | 113 |
| Example 4 | 2.3 | Sulfonic acid-modified silica | 31 | −27.8 | 2 | Triethylenediamine | 3 | 0.1 | Boron | 80.0 |
| Example 5 | 2.3 | Sulfonic acid-modified silica | 31 | −27.8 | 4 | Triethylenediamine | 3 | 0.05 | Boron | 89.2 |
| Example 6 | 2.3 | Sulfonic acid-modified silica | 31 | −27.8 | 1 | Triethylenediamine | 3 | 0.1 | Boron | 42.8 |
| Example 7 | 2.3 | Sulfonic acid-modified silica | 31 | −27.8 | 4 | Triethylenediamine | 3 | 0.01 | Boron | 45.3 |
| Example 8 | 3.0 | Sulfonic acid-modified silica | 31 | −33.6 | 4 | Triethylenediamine | 3 | 0.1 | Boron | 92.7 |
| Example 9 | 4.0 | Sulfonic acid-modified silica | 31 | −44.1 | 4 | Triethylenediamine | 3 | 0.1 | Boron | 75.3 |
| Example 10 | 4.8 | Sulfonic acid-modified silica | 31 | −48.2 | 4 | Triethylenediamine | 3 | 0.1 | Boron | 65.0 |

TABLE 1-continued

| | pH | Kind | Secondary particle size [nm] | Zeta potential [mV] | Content [% by mass] | Kind | Number of carbon atoms bonded to nitrogen atom | Content [% by mass] | Object to be polished Species (impurity) doped on polysilicon | Polishing speed [Å/min] |
|---|---|---|---|---|---|---|---|---|---|---|
| Example 11 | 2.3 | Sulfonic acid-modified silica | 31 | −27.8 | 4 | Triethylenediamine | 3 | 0.1 | Aluminum | 99.6 |
| Comparative Example 1 | 2.3 | Sulfonic acid-modified silica | 31 | −27.8 | 4 | None | — | — | Boron | 14.8 |
| Comparative Example 2 | 5.0 | Sulfonic acid-modified silica | 31 | 50.0 | 4 | Triethylenediamine | 3 | 0.1 | Boron | 35.0 |
| Comparative Example 3 | 6.0 | Sulfonic acid-modified silica | 31 | −63.4 | 4 | Triethylenediamine | 3 | 0.1 | Boron | 23.9 |
| Comparative Example 4 | 2.3 | Sulfonic acid-modified silica | 31 | −27.8 | 4 | Triethylamine | 3 | 0.1 | Boron | 37.7 |
| Comparative Example 5 | 2.3 | Sulfonic acid-modified silica | 31 | −27.8 | 4 | Diethylamine | 2 | 0.1 | Boron | 23.1 |

TABLE 2

| | Polishing composition | | | | | | | | Evaluation | |
|---|---|---|---|---|---|---|---|---|---|---|
| | | Abrasive grain | | | | Additive | | | | |
| | pH | Kind | Secondary particle size [nm] | Zeta potential [mV] | Content [% by mass] | Kind | Number of carbon atoms bonded to nitrogen atom | Content [% by mass] | Object to be polished Species (impurity) doped on polysilicon | Polishing speed [Å/min] |
| Comparative Example 6 | 2.3 | Sulfonic acid-modified silica | 31 | −27.8 | 4 | Benzylamine | 1 | 0.1 | Boron | 11.0 |
| Comparative Example 7 | 2.3 | Sulfonic acid-modified silica | 31 | −27.8 | 4 | Ethylamine | 1 | 0.1 | Boron | 11.4 |
| Comparative Example 8 | 2.3 | Sulfonic acid-modified silica | 31 | −27.8 | 4 | Aniline | 1 | 0.1 | Boron | 21.1 |
| Comparative Example 9 | 2.3 | Sulfonic acid-modified silica | 31 | −27.8 | 4 | Pyridine | 2 | 0.1 | Boron | 27.3 |
| Comparative Example 10 | 2.3 | Surface-unmodified silica | 31 | 10.0 | 4 | Triethylenediamine | 3 | 0.1 | Boron | Not able to be evaluated because of slurry aggregation |
| Comparative Example 11 | 2.3 | Sulfonic acid-modified silica | 31 | −27.8 | 4 | Triethylenediamine | 3 | 0.5 | Boron | Not able to be evaluated because of slurry aggregation |
| Comparative Example 12 | 2.3 | Sulfonic acid-modified silica | 31 | −27.8 | 4 | 2-Azabicyclo[2.2.1]heptane | 2 | 0.1 | Boron | 38.5 |
| Comparative Example 13 | 2.3 | Sulfonic acid-modified silica | 31 | −27.8 | 4 | 7-Azabicyclo[2.2.1]heptane | 2 | 0.1 | Boron | 32.3 |
| Comparative Example 14 | 2.3 | Sulfonic acid-modified silica | 31 | −27.8 | 4 | None | — | — | Aluminum | 10.8 |

As presented in Table 1, in the case of using the polishing compositions of Examples 1 to 11, it has been found that the polishing speed exceeds 40 Å/min and polycrystalline silicon doped with p-type impurities can be polished at a polishing speed higher than that in the case of using the polishing compositions of Comparative Examples 1 to 14.

From the results of Comparative Example 10, it has been found that the abrasive grains in the polishing composition are aggregated in a case in which the zeta potential of the abrasive grains in the polishing composition is positive and this polishing composition is not suitable as a polishing composition. In addition, from the results of Comparative Example 11, it has been found that the abrasive grains in the polishing composition are aggregated when the content of the additive is 0.5% by mass or more with respect to the entire polishing composition mass even in a case in which a crosslinked bicyclic compound having a tertiary nitrogen atom is used as an additive and this polishing composition is not suitable as a polishing composition.

By comparing Examples 1 and 2 with Comparative Examples 12 and 13, it can be seen that polycrystalline silicon doped with p-type impurities can be polished at a high polishing speed as the nitrogen atom of the crosslinked bicyclic compound used as an additive is a tertiary nitrogen atom.

From this fact, it can be seen that the polishing speed of polycrystalline silicon doped with p-type impurities is improved by a polishing composition which has a negative zeta potential of abrasive grains, contains a crosslinked bicyclic compound having a tertiary nitrogen atom at less than 0.5% by mass, and has a pH of less than 5.

This application is based on Japanese Patent Application No. 2020-044292, filed on Mar. 13, 2020, the disclosure of which is incorporated herein by reference in its entirety.

What is claimed is:

1. A polishing method comprising polishing an object to be polished using a polishing composition comprising abrasive grains, an additive, a pH adjusting agent, and a dispersing medium, wherein:
   a zeta potential of the abrasive grains is negative,
   the additive is a crosslinked bicyclic compound having a tertiary nitrogen atom,
   a content of the additive is 0.03% by mass or more and less than 0.5% by mass with respect to an entire polishing composition mass,
   a content of the abrasive grains is 1.5% by mass or more and 20% by mass or less with respect to an entire polishing composition mass,
   a pH of the polishing composition is less than 5,
   the polishing composition does not comprise an oxidizing agent, and
   the object to be polished comprises polycrystalline silicon doped with a p-type impurity.

2. The polishing method according to claim 1, wherein the additive is an azabicyclo compound having a tertiary nitrogen atom as a ring-forming atom and 6 to 12 carbon atoms.

3. The polishing method according to claim 1, wherein the additive is a compound represented by the following structural formula (1):

[Chem. 1]

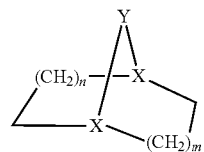

in formula (1),
each X is independently a nitrogen atom or CH,
Y is —NH—, —NR$^1$—, or —R$^2$—, wherein R$^1$ is a substituted or unsubstituted alkyl group having 1 to 3 carbon atoms and R$^2$ is a substituted or unsubstituted alkylene group having 1 to 3 carbon atoms, and
n and m are each independently an integer 0 to 2, wherein at least one of X is N, or Y is —NR$^1$—.

4. The polishing method according to claim 1, wherein a content of the abrasive grains is 1.5% by mass or more and 10% by mass or less with respect to an entire polishing composition mass.

5. The polishing method according to claim 1, wherein the abrasive grains are colloidal silica in which an organic acid is immobilized on a surface.

6. The polishing method according to claim 1, wherein a zeta potential of the abrasive grains is −45 mV or more and −15 mV or less.

7. The polishing method according to claim 1, wherein the polishing composition is used in an application for polishing an object to be polished containing polycrystalline silicon doped with a p-type impurity.

8. A method for producing a semiconductor substrate, the method comprising polishing a semiconductor substrate containing polycrystalline silicon doped with a p-type impurity by the polishing method according to claim 1.

* * * * *